(12) United States Patent
Lindh et al.

(10) Patent No.: US 8,917,679 B2
(45) Date of Patent: Dec. 23, 2014

(54) METHOD FOR SIGNALING THE OVERLAP OF DOWNLINK CONTROL AND DATA CHANNELS

(75) Inventors: Lars E. Lindh, Helsinki (FI); Klaus Hugl, Vienna (AT)

(73) Assignee: Nokia Corporation, Espoo (FI)

( * ) Notice: Subject to any disclaimer, the term of this patent is extended or adjusted under 35 U.S.C. 154(b) by 512 days.

(21) Appl. No.: 13/210,694

(22) Filed: Aug. 16, 2011

(65) Prior Publication Data

US 2013/0044693 A1 Feb. 21, 2013

(51) Int. Cl.
*H04W 4/00* (2009.01)
*H04W 72/04* (2009.01)
*H04W 28/06* (2009.01)

(52) U.S. Cl.
CPC ............ *H04W 72/042* (2013.01); *H04W 28/06* (2013.01)
USPC ........... 370/329; 370/478; 370/480; 370/281; 370/500; 370/437; 455/452.1; 455/464; 455/509

(58) Field of Classification Search
USPC ......... 370/328, 329, 203, 208, 281, 295, 330, 370/341, 478–480, 491, 500; 455/50–452.1, 464, 509–517
See application file for complete search history.

(56) References Cited

U.S. PATENT DOCUMENTS

| 7,852,813 | B2 | 12/2010 | Suh et al. ...................... 370/335 |
| 2007/0060091 | A1 | 3/2007 | Kim et al. ...................... 455/266 |
| 2010/0034303 | A1 | 2/2010 | Damnjanovic et al. ........ 375/260 |
| 2010/0254268 | A1 | 10/2010 | Kim et al. ..................... 370/241 |
| 2010/0279628 | A1 | 11/2010 | Love et al. ...................... 455/70 |
| 2010/0291934 | A1 | 11/2010 | Lopes ........................... 455/446 |
| 2010/0331030 | A1 | 12/2010 | Nory et al. .................... 455/509 |
| 2011/0044391 | A1 | 2/2011 | Ji et al. |
| 2011/0081913 | A1 | 4/2011 | Lee et al. ...................... 455/450 |

(Continued)

FOREIGN PATENT DOCUMENTS

| EP | 2306782 A1 | 4/2011 |
| WO | 2004102839 A1 | 11/2004 |

(Continued)

OTHER PUBLICATIONS

International Search Report and Written Opinion for corresponding International Patent Application PCT/FI2012/050022 filed Jan. 12, 2012, mailed Apr. 4, 2012.

(Continued)

*Primary Examiner* — Dang Ton
*Assistant Examiner* — Mandish Randhawa
(74) *Attorney, Agent, or Firm* — Harrington & Smith (57) ABSTRACT

A network signals an allocation (PDCCH) for a downlink shared channel (PDSCH); and also signals an indication (reference signal RS) whether a resource block (PRB) comprising the allocated downlink shared channel is used for a control channel transmission (E-PDCCH). Examples include the E-PDCCH being time or frequency multiplexed with the PDSCH; and the indication being a different RS sequence (at least one element being phase shifted) than an original RS sequence used if the PRB were not used for the E-PDCCH. The UE tests for the phase shift by blind decoding. If the phase shift is present the UE a) decodes a portion of the PRB for data if the network is using TDM for its E-PDCCH/PDSCH multiplexing, or b) decodes the full PRB only for the E-PDCCH if the network is using FDM for its E-PDCCH/PDSCH multiplexing.

14 Claims, 8 Drawing Sheets

(56) References Cited

U.S. PATENT DOCUMENTS

| | | | |
|---|---|---|---|
| 2011/0085506 A1* | 4/2011 | Lee et al. | 370/329 |
| 2011/0110296 A1* | 5/2011 | Malladi et al. | 370/328 |
| 2011/0249633 A1 | 10/2011 | Hong et al. | 370/329 |
| 2011/0274066 A1 | 11/2011 | Tee et al. | 370/329 |
| 2011/0280223 A1 | 11/2011 | Maeda et al. | 370/335 |
| 2011/0292891 A1 | 12/2011 | Hsieh et al. | 370/329 |
| 2012/0106465 A1* | 5/2012 | Haghighat et al. | 370/329 |
| 2013/0114517 A1 | 5/2013 | Blankenship et al. | 370/329 |
| 2013/0163447 A1 | 6/2013 | Koskela et al. | 370/252 |
| 2013/0208645 A1 | 8/2013 | Feng et al. | 370/312 |
| 2014/0098785 A1 | 4/2014 | Frenne et al. | 370/330 |

FOREIGN PATENT DOCUMENTS

| | | |
|---|---|---|
| WO | 2011019232 A2 | 2/2011 |
| WO | WO-2010/053984 A2 | 5/2012 |
| WO | WO-2010-124721 A1 | 11/2012 |

OTHER PUBLICATIONS

"3rd Generation Partnership Project; Technical Specification Group Radio Access Network; Evolved Universal Terrestrial radio Access (E-UTRA); Physical Channels and Modulation (Release 10)", 3GPP TS 36.211 V10.2.0, Section 6, Jun. 2011, 103 pgs.

* cited by examiner

| ANTENNA PORT p | $[\overline{W}_p(0) \quad \overline{W}_p(1) \quad \overline{W}_p(2) \quad \overline{W}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

FIG.5
PRIOR ART

| ANTENNA PORT p | $[\overline{W}_p(0) \quad \overline{W}_p(1) \quad \overline{W}_p(2) \quad \overline{W}_p(3)]$ |
|---|---|
| 7 | [−1 −1 +1 +1] |
| 8 | [−1 +1 +1 −1] |
| 9 | [−1 −1 +1 +1] |
| 10 | [−1 +1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

METHOD FOR SIGNALING THE OVERLAP OF DOWNLINK CONTROL AND DATA CHANNELS

TECHNICAL FIELD

This invention relates generally to radio frequency (RF) reception and transmission and, more specifically, relates to downlink control and shared channels such as for example the enhanced PDCCH (E-PDCCH) and PDSCH in the LTE system.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
    BS base station
    DL downlink (network towards UE)
    eNodeB EUTRAN Node B (a BS in the LTE system)
    E-PDCCH enhanced PDCCH
    EUTRAN evolved UTRAN (LTE)
    FDM frequency division multiplexing
    LTE long term evolution
    MAC medium access control
    MIMO multiple input multiple output
    MME mobility management entity
    Node B base station (includes BTS)
    PDCCH physical downlink control channel
    PDSCH physical downlink shared channel
    PRB physical resource block
    PUSCH physical uplink shared channel
    RB resource block
    RE resource element
    RF radio frequency
    RS reference signal
    TDM time division multiplexing
    UE user equipment
    UL uplink (UE towards network)
    UTRAN universal terrestrial radio access network The LTE system is to provide significantly enhanced services by means of higher data rates and lower latency with reduced cost. In the LTE and other cellular radio systems the base station (termed an eNodeB or eNB in LTE) signals the time-frequency resources allocated to a mobile terminal (UE). In LTE the downlink and uplink resources are allocated via the PDCCH in terms of RBs. The number of RBs available in a time slot depends on the bandwidth and varies from 6 to 100, corresponding to bandwidths of 1.25 and 20 MHz respectively.

In LTE there is frequency selective scheduling for the DL and UL shared data channels (PDSCH and PUSCH) in order to allocate the best RBs for each terminal. This gives the best performance but is also the most expensive in terms of signaling. While this scheduling technique allows advanced multi-antenna techniques like precoded transmission and MIMO operation for the downlink shared data channel, currently the user specific downlink control signaling on the PDCCH does not employ any of these gaining mechanisms (e.g., frequency domain scheduling gain, advanced multi-antenna gains). To improve the PDCCH multiplexing capacity as well as to exploit some of these gaining mechanisms the 3GPP organization has initiated a study item for enhanced downlink control signaling using UE-specific reference signals enabling enhanced multi-antenna transmission also for the user specific DL control channel.

LTE is a heterogeneous network, in which there are access nodes apart from the traditional BSs which operate at different power levels. For example, there may be privately operated femto nodes to which the conventional (macro) eNodeBs can offload traffic; and/or there may be remote radio heads or repeaters to fill coverage holes. Heterogeneous networks are susceptible to widely varying interference, and LTE introduces a new logical channel E-PDCCH.

Figure 1:
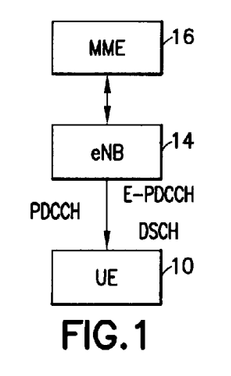
FIG. 1 is a block diagram illustrating one exemplary radio environment and the relevant logical channels for implementing the invention in an LTE radio system.

FIG. 1 is a block diagram illustrating the radio environment and the relevant logical channels in LTE. There is a MME 16 which interfaces multiple eNodeBs 14 to the Internet or other broader communication network, and the eNodeB 14 communicates with on the UE 10 under its control over the wireless interface. The control information from eNodeB 14 for UE 10 is carried on the PDCCH and/or the E-PDCCH, including resource allocations etc. The E-PDCCH is relevant since if the UE has an allocation in the DL the allocated PDSCH resources might lie in a same RB where the E-PDCCH is sent. Further detail in this regard is shown below with respect to FIGS. 2A-B and 3. Considering that radio spectrum is a scarce resource, it is advantageous that the E-PDCCH and PDSCH can share the available RBs in a radio-efficient manner. The resources for the E-PDCCH might be already reserved for the PDSCH (according to LTE Release 8 to Release 10 specification), but currently there is no way for the UE which has the DL allocation for the PDSCH to know whether there would be a E-PDCCH transmission placed within its allocated PDSCH resources, either in that same RB or a RB within the PDSCH allocation).

The exemplary embodiments of the invention detailed below provide a means to improve the efficiency of the PDSCH granted by the E-PDCCH. While these examples are in the context of the LTE system to show more specific details of an LTE implementation, the broader teachings herein are readily applicable to any radio access technology in which the network signals radio resource allocations to UEs.

SUMMARY

In a first exemplary aspect of the invention there is an apparatus which includes at least one processor and at least one memory including computer program code. The at least one memory and the computer program code are configured to, with the at least one processor and in response to execution of the computer program code, cause the apparatus to perform at least the following: signal an allocation for a downlink shared channel; and signal an indication whether a portion of (TDM) or a full (FDM) resource block comprising the allocated downlink shared channel is used for a control channel transmission.

In a second exemplary aspect of the invention there is a method which includes the following: signaling by an apparatus an allocation for a downlink shared channel; and signaling by the apparatus an indication whether a portion of (TDM) or a full (FDM) resource block comprising the allocated downlink shared channel is used for a control channel transmission.

In a third exemplary aspect of the invention there is a computer program product comprising a computer-readable medium bearing computer program code embodied therein for use with a computer, the computer program code comprising: code for signaling an allocation for a downlink shared channel; and code for signaling an indication whether a portion of (TDM) or a full (FDM) resource block comprising the allocated downlink shared channel is used for a control channel transmission.

In a fourth exemplary aspect of the invention there is an apparatus which includes at least one processors and at least one memory including computer program code. In this aspect the at least one memory and the computer program code are configured to, with the at least one processor and in response to execution of the computer program code, cause the apparatus to perform at least the following: determine whether a resource block received on an allocated downlink shared channel comprises an indication that a portion of (TDM) or a full (FDM) resource block is used for a control channel transmission; and decode the resource block for data according to whether or not the indication is present.

In a fifth exemplary aspect of the invention there is a method which includes the following: determining whether a resource block received on an allocated downlink shared channel comprises an indication that a portion of (TDM) or the full (FDM) resource block is used for a control channel transmission; and decoding the resource block for data according to whether or not the indication is present.

In a sixth exemplary aspect of the invention there is a computer program product comprising a computer-readable medium bearing computer program code embodied therein for use with a computer, the computer program code comprising: code for determining whether a resource block received on an allocated downlink shared channel comprises an indication that a portion of (TDM) or the full (FDM) resource block is used for a control channel transmission; and code for decoding the resource block for data according to whether or not the indication is present.

DETAILED DESCRIPTION

Since radio resources reserved for the E-PDCCH are carved out of those reserved for the PDSCH, to promote efficient use of the spectrum it is important that what is taken from the PDSCH reservation for E-PDCCH use is no more than is needed. One way to do this is to give back for PDSCH use those E-PDCCH resources which are not being used currently for E-PDCCH purposes. The eNodeB can do so since it is aware of how much time/frequency resources it is using for the E-PDCCH, but the UE needs to know also else it will assume all the E-PDCCH resources are being used for that purpose.

Figure 2A:
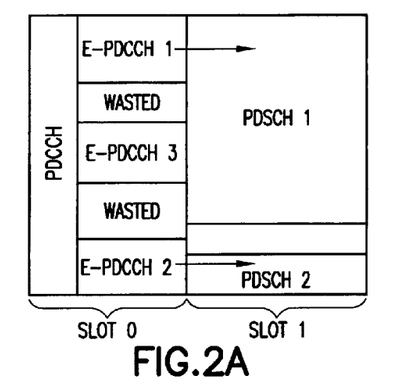
FIG. 2A is a time/frequency diagram of a DL subframe which separates the PDSCH from the E-PDCCH by time slot but which sometimes results in wasted bandwidth as illustrated.
Figure 2B:
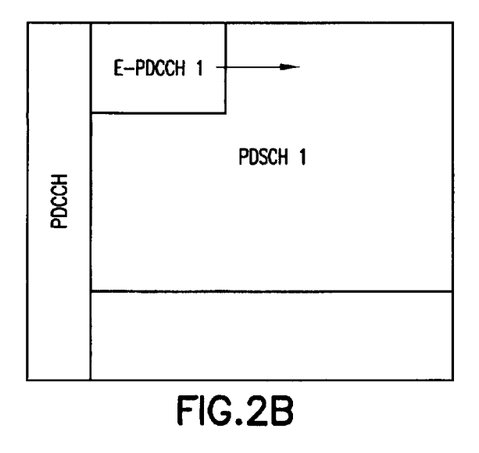
FIG. 2B is similar to FIG. 2A but in which the PDSCHs for one UE may be considered to wrap around the E-PDCCH for the same UE but the time domain multiplexing of E-PDCCH with PDSCHs is limited to a single UE only, resulting in less flexibility than is optimal.

FIGS. 2A-B illustrate the problem in two ways. For simplicity assume that all PRBs in the latter part of slot 0 are reserved for E-PDCCH. At FIG. 2A the portion of slot 0 which is actually used for E-PDCCHs are marked with lighter shading, and the UE 10 knows that slot 0 has the E-PDCCHs and that slot 1 has the PDSCHs (shown by darker shading). FIG. 2A is a straight forward approach to share the RB amongst the E-PDCCH and PDSCH but it is inefficient. Where the E-PDCCH uses less than the whole slot 0 there is no opportunity to place a PDSCH in the unused time-domain symbols reserved for E-PDCCH, shown in FIG. 2A as 'wasted'. But it is possible to freely multiplex other E-PDCCHs in a time-domain manner with the PDSCH intended for another user (e.g. E-PDCCH3 for UE3 with PDSCH1 for UE1, assuming the same precoding as for PDSCH1). The FIG. 2A option for the PDSCH may be referred to as "time-domain PDSCH" mapping since the E-PDCCH and the PDSCH are separated for the UE by time (slot).

At FIG. 2B the PDSCH also covers unused E-PDCCH positions in order to have a better utilization, but in this case the full time-domain multiplexing of the E-PDCCH and the addressed E-PDCCH noted for FIG. 2A is lost in FIG. 2B. For FIG. 2B we cannot assume that E-PDCCHs for other UEs are time-domain multiplexed together with the PDSCH of the UE of interest. So the PDSCH for a UE of FIG. 2B may be considered to be "wrapped-around" the resource elements that are utilized for E-PDCCH transmission of that specific UE, and so this mode of PDSCH mapping may be termed "wrap-around PDSCH".

Figure 2C:
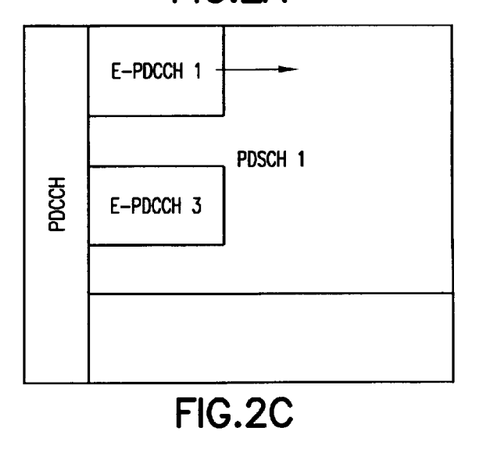
FIG. 2C is a hybrid of FIGS. 2A-B and is enabled to exploit the advantages of both FIGS. 2A-B according to exemplary embodiments of the invention, namely the PDSCH allocation of one UE wraps around the E-PDCCH of possibly several independent UEs.

While FIG. 2A might result in an unnecessary loss of PDSCH capacity (in case no proper pairing is possible or E-PDCCH capacity is required) and FIG. 2B might restrict the additional E-PDCCH capacity due to E-PDCCH scheduling restrictions, FIG. 2C takes the most useful aspects of both and allows the full multiplexing flexibility with no necessary loss in PDSCH capacity for this time domain multiplexing approach since if there is no E-PDCCH then all the radio resources can still be used for the PDSCH.

Figure 3A:
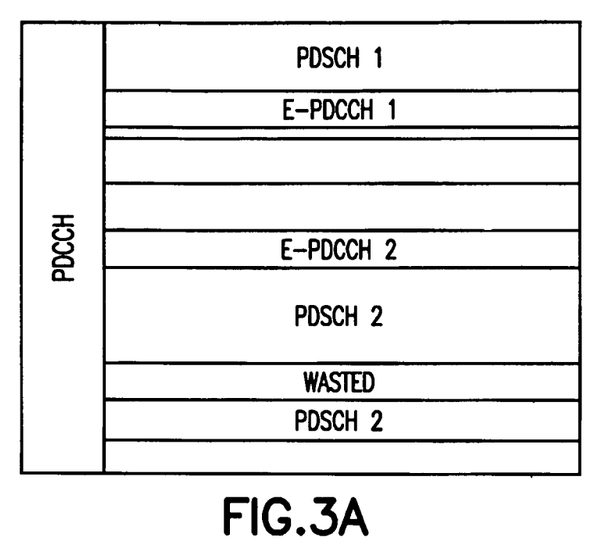
FIG. 3A is a time/frequency diagram of a subframe which separates PDSCH from E-PDCCH in the frequency domain but which sometimes results in wasted bandwidth as the E-PDCCH resources are fixed reserved.
Figure 3B:
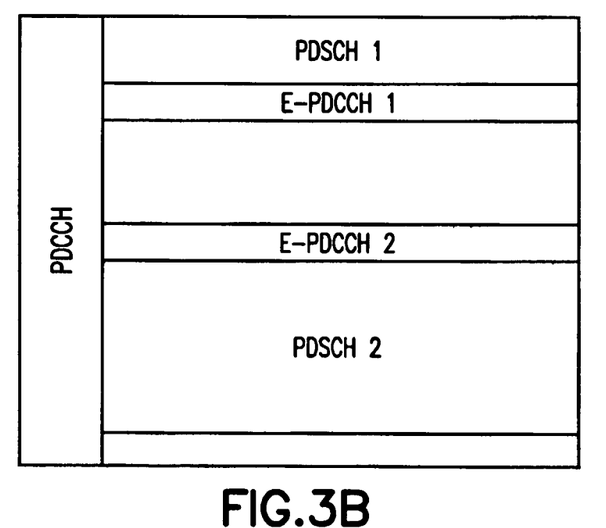
FIG. 3B is similar to FIG. 3A but in which within the PDSCH allocation there is no E-PDCCH present and the E-PDCCH and PDSCH collision is taken care of by PDSCH scheduling restrictions, resulting in possible waste of PDSCH resources and/or E-PDCCH scheduling restrictions.

FIGS. 3A-B illustrate the case of frequency domain separation between E-PDCCH and PDSCH in two ways. At FIG. 3A the PRBs which are actually used for E-PDCCH are marked with lighter shading, and the UE 10 knows that resources reserved for E-PDCCH are not available for PDSCH. FIG. 3A is a straight forward approach to share the RBs amongst E-PDCCH and PDSCH in a fixed manner but it is inefficient. In case RBs reserved for E-PDCCH are not utilized there is no opportunity to place PDSCH in these unused reserved PRBs, shown in FIG. 3A as "wasted". But it is possible to freely multiplex E-PDCCHs for other UEs in a frequency domain manner with the PDSCH intended for another user. The FIG. 3A option for the PDSCH may be referred to as "fixed frequency domain E-PDCCH reservation" since there is a fixed amount of PRBs reserved for E-PDCCH.

At FIG. 3B the PDSCH can also cover unused E-PDCCH positions in order to have a possible better utilization by restricting the PDSCH scheduling to guarantee that no E-PDCCH is multiplexed within the PDSCH allocation. For FIG. 3B we cannot assume that other E-PDCCHs are frequency domain multiplexed within the PDSCH allocation of UE 10.

Figure 3C:
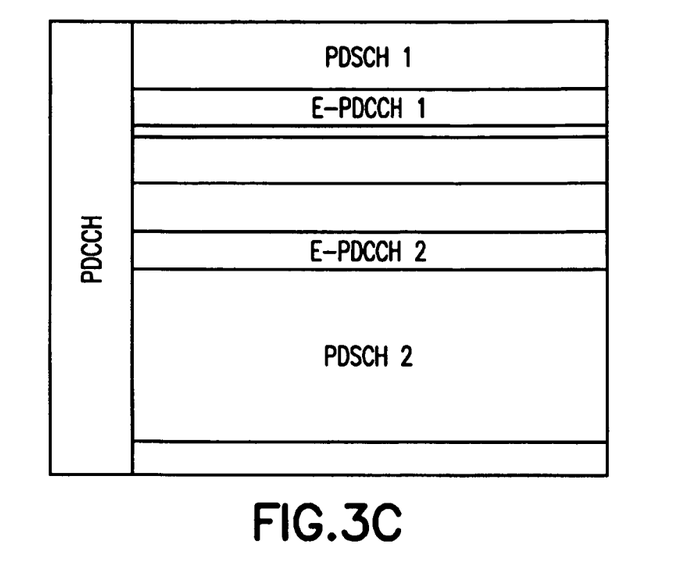
FIG. 3C is a hybrid of FIGS. 3A-B and is enabled to exploit the advantages of both FIGS. 3A-B according to the exemplary embodiments of the invention which enables any E-PDCCH to be present within the PDSCH allocation of a UE without scheduling restrictions.

While FIG. 3A might result in an unnecessary loss of PDSCH capacity and FIG. 3B might restrict the additional E-PDCCH capacity, FIG. 3C takes the most useful aspects of both and allows full multiplexing flexibility of E-PDCCH and PDSCH with no necessary loss in PDSCH capacity for a frequency domain multiplexing approach of E-PDCCH and PDSCH assumed in FIGS. 3 A-C.

While the above shows that FIG. 2C and 3C represent the more efficient option for having the E-PDCCH and the PDSCH share the same PRB or frequency band, respectively, standing alone FIGS. 2C and 3C do not tell how the UE can know exactly where to decode the PDSCH. The UE must be made aware whether there is some E-PDCCH present in the PRB in which it has its allocated PDSCH. The embodiments below do this through signaling on a per PRB basis. While the embodiments detail an implicit signalling solution so as to save on control signalling overhead, explicit signalling (e.g., bit on indicates an E-PDSCH is present, bit-off indicates there is none) is also within the scope of these teachings.

In an embodiment there are two possible RS combinations which are used to indicate, on a PRB and for a single PRB, if an E-PDCCH transmission is present or not. As will be detailed below, for the exemplary time domain multiplexing embodiments the RS combination indicates whether or not a portion of the PDSCH PRB has an E-PDCCH; and for the exemplary frequency domain multiplexing embodiments the RS combination indicates whether or not the full PDSCH PRB has an E-PDCCH.

In 3GPP Release 10 of the LTE specifications there is specified an air interface for the backhaul for relay nodes (RN). These specifications provide for a special downlink control channel for this purpose, called the R-PDCCH. The solution used by the R-PDCCH concept is that the PDSCH can assume that there is no overlapping R-PDCCH in its allocation area, as illustrates at FIG. 2A. Co-owned U.S. patent application Ser. No. 12/931,858 (filed Feb. 11, 2011 and entitled "DL Control Channel Structure Enhancement") provides that the PDSCH never use the region that is reserved for the E-PDCCH. These teachings improve upon the embodiments detailed in that co-owned US patent application in that neither the E-PDCCH nor the PDSCH is penalized.

The exemplary embodiments of these teachings enable the wrap-around arrangement for PDSCH transmissions shown at FIGS. 2C and 3C which is seen to offer the highest flexibility since it takes into account the E-PDCCH of the UEs which have their allocated PDSCH in the same PRB as well as other UEs' E-PDCCHs by means of the indication mentioned above as to whether there is an E-PDCCH present or not in that PRB (which is the same PRB as the allocated PDSCH).

In one exemplary embodiment this indication takes the form of a different UE-specific reference signal in the PRB. In a specific embodiment, the RSs are differentiated by a phase shift in the first slot (e.g., 180 degree phase shift).

Figure 4:
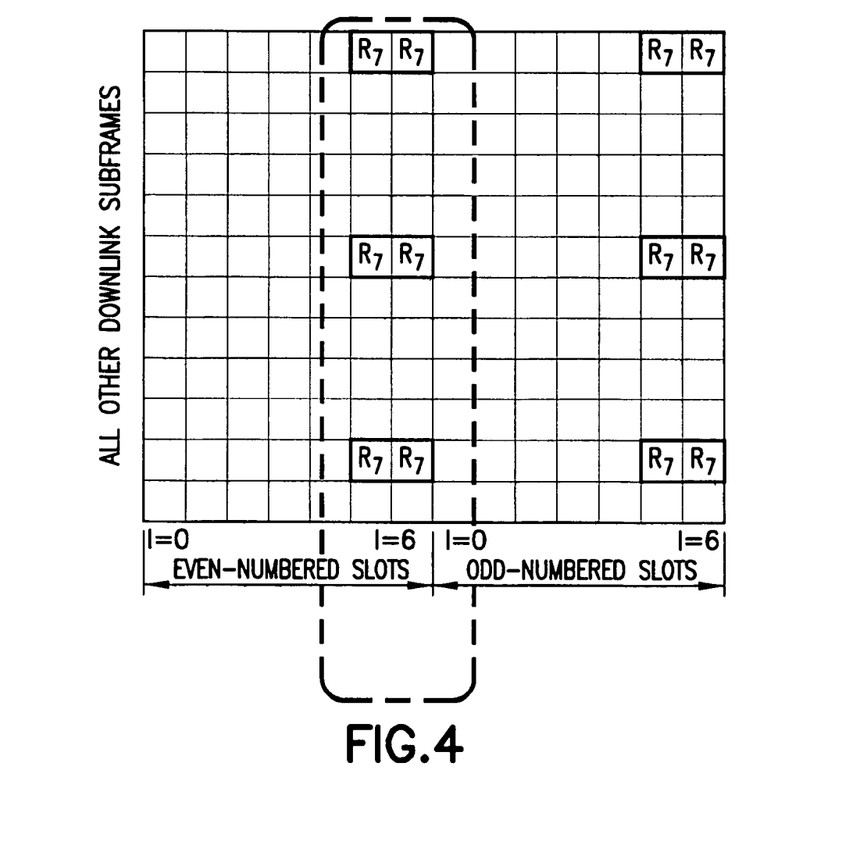
FIG. 4 is a PRB/slot depiction of reference signals, of which those pairs in the first slot encircled by the dashed line are the RSs which are phase shifted relative to the ones in the second slot so as to act as the indication that an E-PDCCH is present in the PRB according to exemplary embodiments of the invention detailed herein.

FIG. 4 illustrates such an exemplary embodiment; the relevant RSs which have the phase shift to indicate there is an E-PDCCH present in the PRB (or equivalently which lack the phase shift to indicate there is no E-PDCCH present) are indicated by the dashed line. In FIG. 4 each RS is spread over four resource elements (columns) at the same frequency allocation (rows). The first two (in the first slot) are inverted and the second two (in the second slot) are not to indicate an E-PDCCH is present. Using the example table of FIG. 6 the phase shift can be applied to all RSs in the first slot for another implementation. And in still a further implementation there can be a different phase shifting applied so that the UE can detect whether the RSs are shifted from reading them in a single slot only (for example, orthogonal RSs disposed in slot 0). In either case the UE compares RSs within a single subframe to test whether they are phase-shifted relative to one another.

The UE always uses the (180 degree) phase shifted RSs for its UE-specific E-PDCCH search space in the PRB, for E-PDCCH searching and decoding in that same PRB as carries the RSs. That is, the UE will always attempt to decode the E-PDCCH with the phase-shifted RS. If the UE detects there is no phase shift of the RS present, the UE decodes the full PRB as PDSCH under the assumption that this PRB does not contain E-PDCCH. In case of frequency domain multiplexing of PDSCH and E-PDCCH no further action is needed. Depending on the configuration and usage of the system it could happen that a particular UE is configured to use different RS patterns (corresponding to different antenna ports) for the E-PDCCH and the PDSCH (for example E-PDCCH uses R7 and PDSCH uses R8). In this case there shall be a phase shift for both RS patterns in the PRB containing the E-PDCCH.

In case of the hybrid time/frequency domain multiplexing of E-PDCCH and PDSCH of e.g. FIG. 2C, the UE knows that it must decode (at least part of) this PRB since it was allocated DL resources on it (the PDSCH), so it will decode to look for its scheduled data. More specifically, for the PDSCH decoding the UE reads the UE-specific reference symbols and makes a test for a 180 degree phase shift of the reference signal in slot 0, such as by comparing channel estimation power as shown below.

If the test shows that there is a 180 degree phase shift, the UE is aware that there is an E-PDCCH transmission in this PRB. Assume the convention understood by both the eNodeB and the UE is that the E-PDCCH, if present, start at the beginning of this subframe on that specific PRB. Other embodiments may have it disposed elsewhere in the subframe, so long as both the eNodeB and the UE have the same understanding of where.

For the case in which the UE does find there is a 180 degree phase shift of the RS in slot 0, and then based on detecting that shift the UE uses the phase shifted RSs for the related channel estimation for this PRB. From that phase shift which the UE found, the UE assumes that there is an E-PDCCH in the beginning of the subframe, and so the UE excludes the corresponding REs (whose location in the subframe are mutually understood as noted above) from its PDSCH decoding process due to the hybrid time/frequency multiplexing of PDSCH and E-PDCCH according to the non-limiting example in FIG. 2C.

For the case in which the UE finds there is no phase shift of the RSs in slot 0, then based on detecting that lack of a shift the UE assumes there is no co-scheduled E-PDCCH transmission in that PRB. The UE then uses those RSs based on the original RS sequence for its decoding of the PDSCH including the related channel estimation for this PRB. The UE assumes there is no co-scheduled E-PDCCH in this PRB and uses all available REs in this PRB in its PDSCH decoding process. This UE behavior is the same for the hybrid time/frequency multiplexing of E-PDCCH and PSDCH of FIG. 2C and the frequency domain multiplexing of FIG. 3C.

If the system is configured to use different RS patterns (for example R7 and R8) for different UEs each UE must be aware of it and perform the phase shift test for all potential RS patterns as described above.

By the above example it can be seen that exemplary embodiments of the invention enable a flexible wrap-around of the PDSCH relative to the used E-PDCCH. In one implementation the same RS port (e.g., port 7) at the UE is used for both the E-PDCCH and the PDSCH (for example, in a relay PDCCH type of operation this means the same precoder is used for the E-PDCCH and the PDSCH). In another implementation, for a given UE there are different RS patterns/shifts corresponding to its different antenna ports for the different channels in order to indicate whether or not an E-PDCCH is present (if both RS pairs are shifted there is an E-PDCCH, else there is none in that PRB). As another example, to signal that there is an E-PDCCH present in the PDSCH resource block the eNodeB might use a phase shifted RS of [+1 +1 −1 −1] for antenna port 9 when signaling one UE and a phase shifted RS of [+1 −1 −1 +1] for antenna port 9 when signaling another UE, and will use still different RS phase shifts for antenna port 10 when signaling those same UEs.

Figure 5:
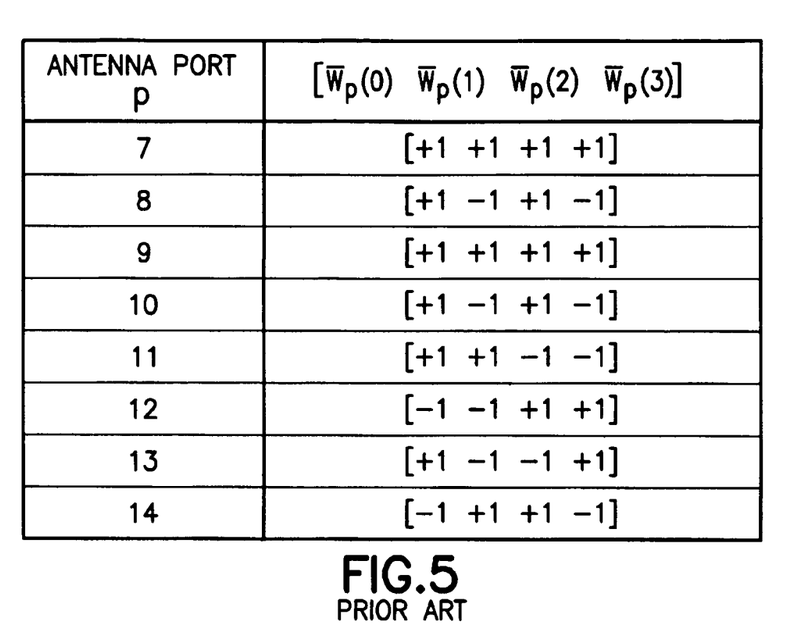
FIG. 5 is a prior art table showing w(i) cover sequences for generating UE-specific reference signals.

FIG. 5 is a prior art table of reference signal cover sequence w(i) generation reproduced from Table 6.10.3.2-1 of the current version of 3GPP TS 36.211. One manner to implement the above teachings for the LTE system is to modify this table as shown for example at FIG. 6 to create a different, preferably orthogonal RS by using e.g. 180 degree phase shifts of at least some elements of a given RS. Such a modified table would be stored in the local memory of the eNodeB which would use it to generate the RSs as noted above. If the eNodeB wanted to signal the 180 degree shift in the RS pair it would use the table at FIG. 6 to phase shift the RSs in the first slot sent from antenna ports 7 and 8 for $w_p(0)$ and $w_p(1)$, and if it instead wanted to signal there is no E-PDCCH in the PRB it would use the conventional table at FIG. 5 to generate those RSs. Ports 11-14 from the current LTE specifications are not usable for this purpose as this could create ambiguity problems of the phase shifted RS and the original RSs for ports 11-14 and so those are shaded at FIG. 6.

Figure 6:
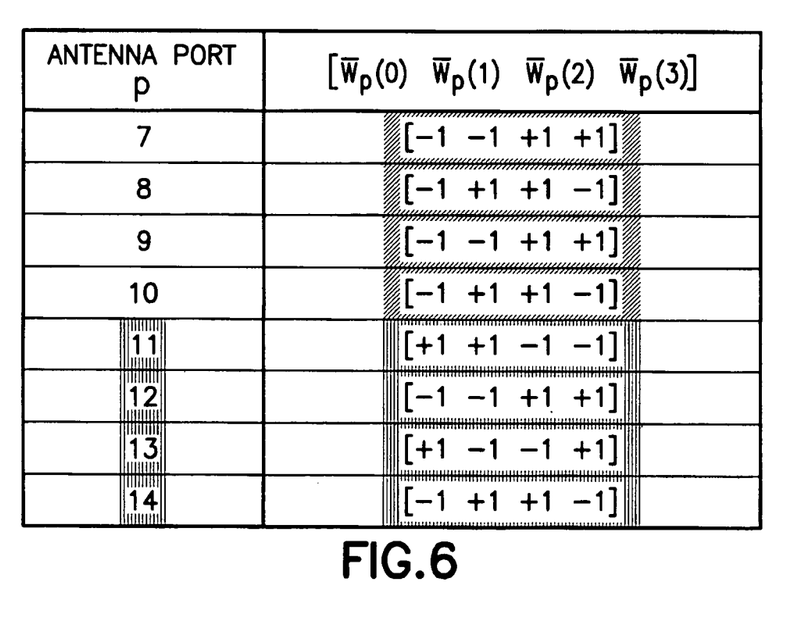
FIG. 6 is similar to FIG. 5 but modified to impose a phase shift for antenna port 7 & 8 for wp(0) and wp(1) to act as the indication mentioned for FIG. 4.

Compare the RS for antenna port 7 at FIGS. 5 and 6. These are phase shifted versions of one another even though not every element in the full RS sequence is shifted, but that is enough for the UE to see the shift. So for example if RS [+1 +1 +1 +1] (from port 7 of FIG. 5) is the original RS, with the first two RS elements belonging to slot 0 and the last two RS elements belonging to slot 1, which according to these teachings acts as an indication that the allocated PDSCH PRB does not contain an E-PDCCH, then the phase shifted version of that same RS (e.g., RS [−1 −1 +1 +1] from port 7 of FIG. 6) will serve according to these teachings as the indication that the allocated PDSCH PRB does contain an E-PDCCH.

From the UE perspective, it determines whether different RS, e.g. a 180 degree phase shift is introduced or not for the possible RS ports usable for the E-PDCCH. One exemplary but non-limiting method to do this is for the UE to calculate the channel estimate based on the hypothesis of 180 degrees phase shift $\tilde{H}_{180}$ and on the hypothesis of no phase shift $\tilde{H}$ for the possible antenna ports for E-PDCCH transmission. The former tests whether the eNodeB used the FIG. 6 table to generate the RSs it sent in that PRB and the latter tests if it used the FIG. 5 table. Specifically, if $abs(\tilde{H}_{180}) > abs(\tilde{H})$ the UE will assume there is an E-PDCCH present and it will take that into account when decoding the PDSCH.

For the case in which the wireless network supports both TDM and FDM multiplexing of the E-PDCCH with the PDSCH, then it may send some second indication of whether this PRB is multiplexed using FDM or TDM. For example, the second indication may be implemented via higher layer signaling such as radio resource control signaling or it may be included in system information whether FDM or TDM multiplexing is in use for a network which supports both. Such a second indication is not necessary if the network supports only one of the FDM or TDM techniques (assuming the wireless specifications support only one in which case the UE will not need to learn if some networks use TDM and some use FDM).

Figure 7:
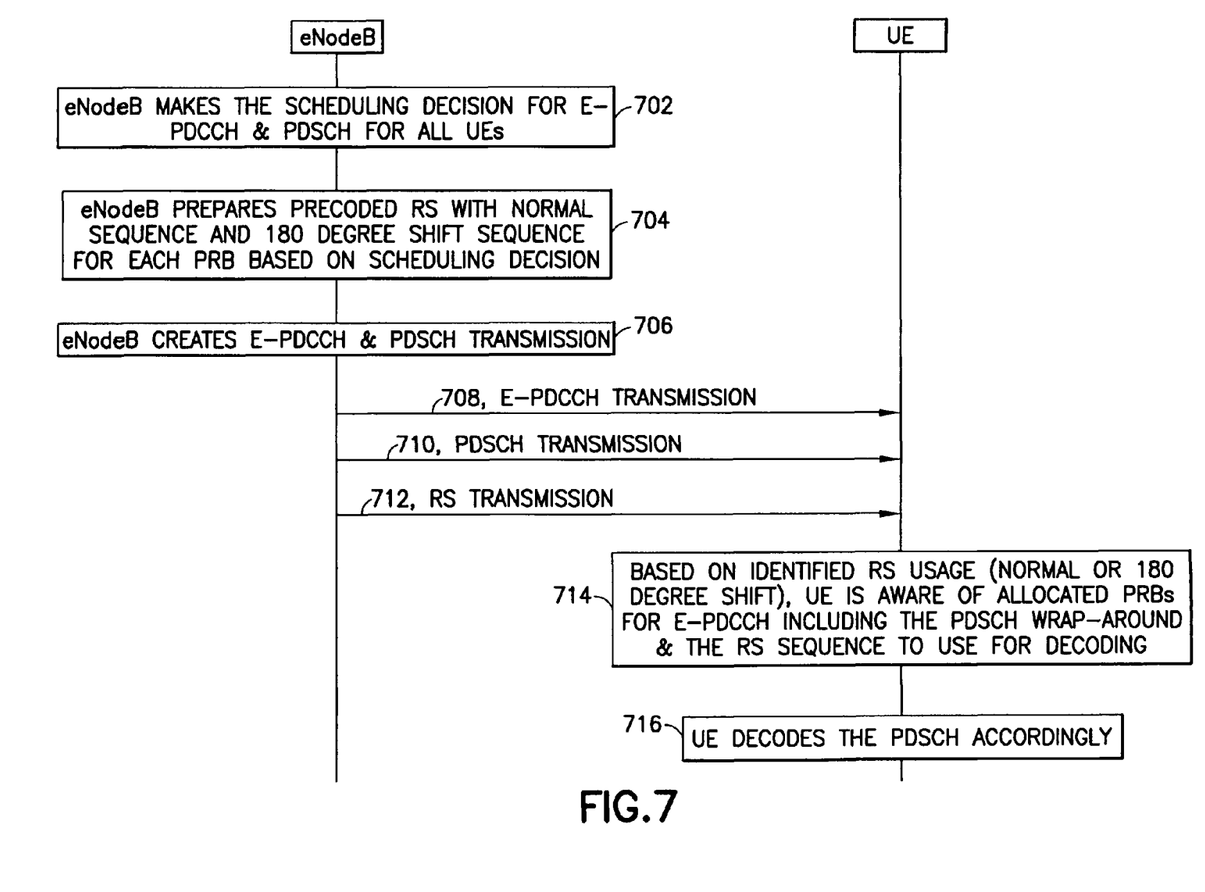
FIG. 7 is a signalling diagram showing actions at the eNodeB and at the UE according to exemplary embodiments of the invention.

FIG. 7 is a flow diagram illustrating in general those actions taken by the eNodeB and by the UE. At block 702 the eNodeB decides the scheduling for all of the UE's under its control to which resources are allocated. On a per PRB basis, at this point the eNodeB knows whether or not an E-PDCCH will be present. Block 704 has the eNodeB preparing the RSs for those PRBs; for those which are to carry an E-PDCCH the eNodeB will generate them using the table of FIG. 6 so as to impose the (exemplary) 180 degree shift of the RSs in the first slot, and for those which are to carry no E-PDCCH the eNodeB will generate the relevant RSs using the table of FIG. 5 so they will have no phase shift.

With the RSs generated for the various PRBs, at block 706 the eNodeB then creates the PDSCHs and the E-PDCCHs (if any) for transmission and transmits them respectively in 708, 710 and 712.

The UE will receive these signals 708, 710, 712 and check for each allocated PDSCH PRB for a phase shift of the RS in the first slot, such as by using the hypothesis testing noted by example above. In this example the UE does detect a 180 degree phase shift at block 714 and so it knows that there is an E-PDCCH within the PRB and the PDSCH wraps around the REs allocated for that E-PDCCH. Consequently, the UE uses the phase shifted version to decode the PDSCH portion of that PRB to get its data at block 716 for the hybrid time/frequency multiplexing of FIG. 2C. In case of frequency domain multiplexing of PDSCH and E-PDCCH of FIG. 3C, the UE neglects this PRB for PDSCH decoding. For the PRBs not containing E-PDCCH (i.e. the UE has not detected the different RS sequence created by 180 phase shifts of part of the sequence), the UE will decode the PDSCH over the full PRB utilizing the normal, non-shifted RS. This is true for both of the above embodiments, the hybrid time/frequency of FIG. 2C as well as the frequency multiplexing of PDSCH and E-PDCCH of FIG. 3C. In either embodiment the UE will always use the phase shifted RS version to decode the E-PDCCH (blind decoding).

For a specific implementation of the time-domain multiplexing embodiment (FIG. 2C), if we assume port 7 (inverted) is used for E-PDCCH decoding and if port 7 (inverted) is present then the UE knows there is an E-PDCCH present and that it should use ports 7 (inverted), 8 (inverted), 9 (inverted) and 10 (inverted) for PDSCH decoding (since the E-PDCCH is present). If the E-PDCCH is not present the UE will decode using ports 7-10 (none inverted). For a specific implementation of the frequency domain multiplexing embodiment (FIG. 3C), if we again assume port 7 (inverted) is used for the E-PDCCH decoding then the UE receiving the PDSCH will detect port 7 (inverted) on a certain PRB and know that an E-PDCCH is present but there no PDSCH in this specific PRB. In this case the UE would decode the PRBs around but not including that PRB which contains the E-PDCCH using ports 7-10 (none inverted). These two multiplexing embodiments use slightly different ports for the decoding.

One technical effect of the above exemplary embodiments is that they provide a way for the network access node/eNodeB a way to signal the presence of one or several E-PDCCHs inside a PDSCH allocation with no additional signaling overhead. As noted above this enables the possibility to fully wrap the PDSCHs around all possible multiplexings of the E-PDCCH, no matter where the E-PDCCHs are located as shown at FIG. 3. This is simple to implement as shown with respect to FIGS. 5-6, and is operable for any kind of E-PDCCH as long as the general structure (e.g., time domain multiplexing, frequency domain multiplexing, hybrid) is known to the UE. Then the UE can also conclude exactly which PRBs and symbols are parts of an overlapping E-PDCCH.

The embodiments of the invention as particularly detailed above do not raise any new issues or cause any drawback or problems for other parts of the control channel. The embodiments above restrict the PDSCH transmission to rank=4, but this is due to a differentiation problem between RS ports 7-10 and 11-14 due to how this phase shifted RS pair is applied. Other than the rank=4 limit these teachings for an LTE system allows full flexibility in scheduling E-PDCCHs inside the PDSCH region.

Figure 8A:
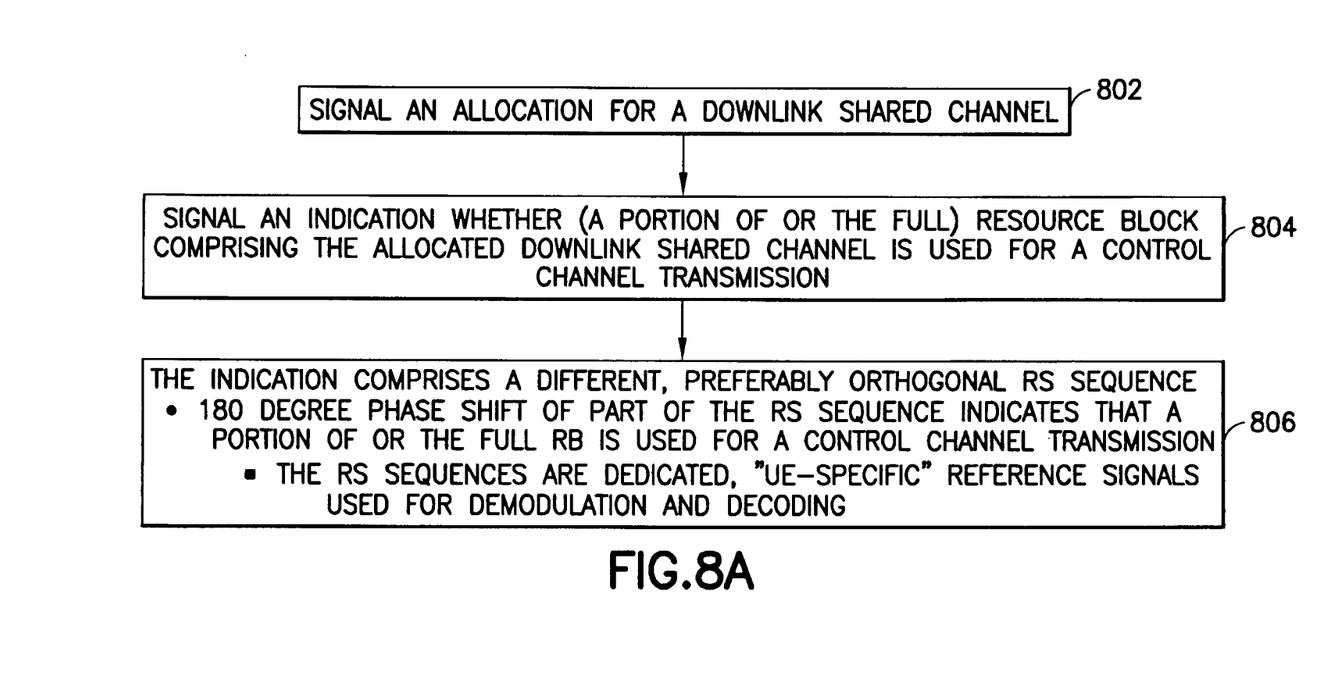
FIGS. 8A-B are flow diagrams illustrating a method, and actions taken by an apparatus, and the result of executing an embodied computer program from the perspective of the eNodeB and the UE respectively, according to the exemplary embodiments of the invention.

Turning to FIG. 8A there is a flow diagram illustrating an exemplary method, and actions taken by an eNodeB (or one or more components thereof), and the result of computer program instructions stored on a tangible memory when such instructions are executed by one or more processors. At block 802 the eNodeB/apparatus signals an allocation for a downlink shared channel. At block 804 it signals an indication whether (depending on whether a TDM or FDM embodiment, a portion of or a full) resource block comprising the allocated downlink shared channel is used for a control channel transmission. According to the exemplary and non-limiting embodiments detailed above, block 806 details various options in order of increasing detail: the indication comprises a different, preferable orthogonal reference signal sequences; the indication comprises two reference signal sequence candidates or possibilities in which a 180 degree phase shift of part of the RS sequence indicates that a portion of or the full resource block is used for a control channel transmission. As noted above, in an embodiment the reference signal sequences are dedicated, "UE-specific" reference signal sequences (DM-RS), and when used as the indication detailed in the above examples the sequence is disposed in a first slot of the PRB which has the multiplexed E-PDCCH and PDSCH.

Figure 8B:
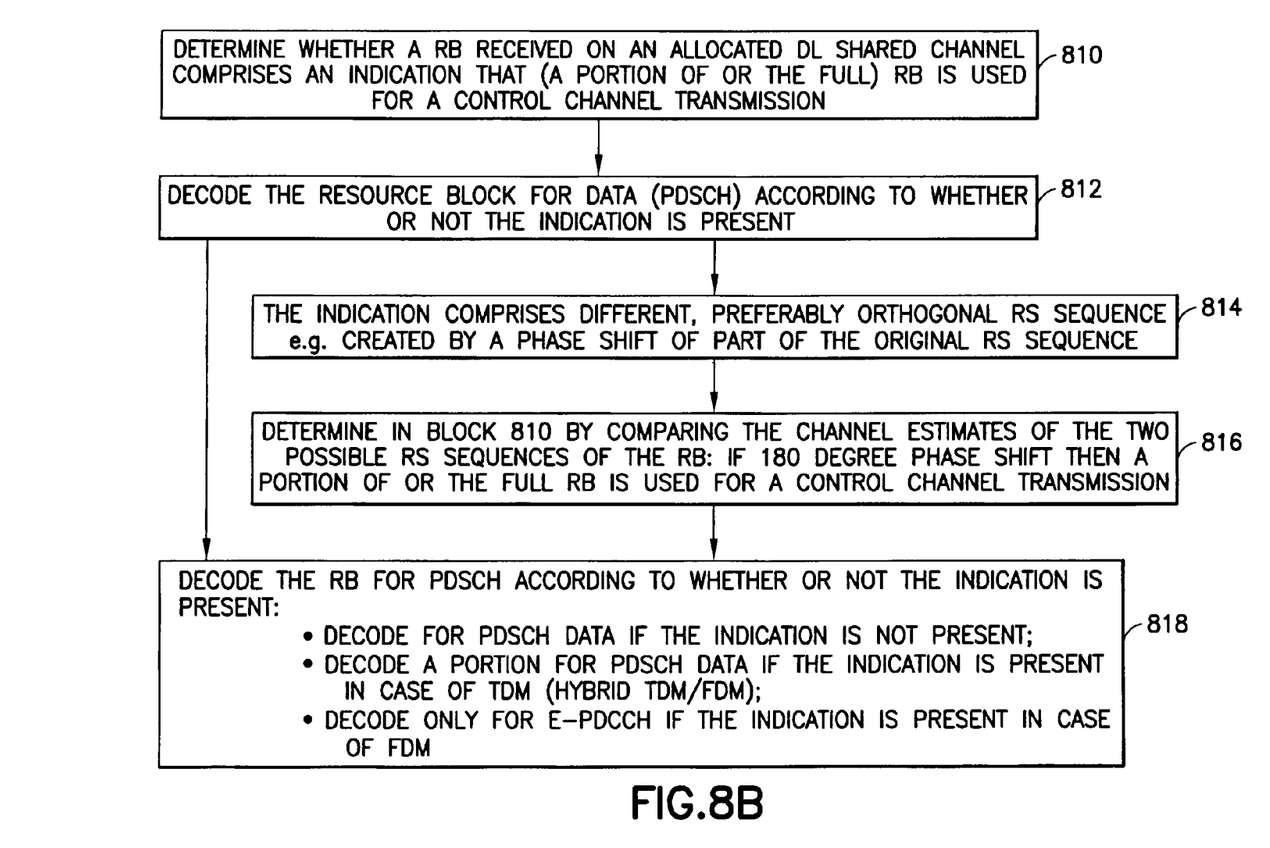

FIG. 8B is a flow diagram illustrating an exemplary method, and actions taken by a UE (or one or more components thereof), and the result of computer program instructions stored on a tangible memory when such instructions are executed by one or more processors. At block 810 the apparatus determines whether a resource block received on an allocated downlink shared channel comprises an indication that (a portion of or the full) resource block is used for a control channel transmission. At block 812 the apparatus decodes the resource block for data according to whether the indication is present.

According to the exemplary and non-limiting embodiments detailed above, block 814 details that the indication comprises different, preferably orthogonal RS sequences, for example created by a phase shift of part of (at least one element of) the original reference signal sequence (original being the one which would be used if there is no multiplexing of the E-PDCCH and the PDSCH); block 816 details that the determining of block 810 is by comparing the channel estimates of the two candidate or possible reference signal sequences and if there is a 180 degree phase shift detected then the apparatus concludes that a portion of or the full resource block is used for a control channel transmission.

Block 818 adds a further step to blocks 810 and 812; the apparatus decodes the resource block for data according to whether or not the indication is present. Specifically, the apparatus decodes the resource block for PDSCH data for the case the indication is not present; and decodes a portion of the resource block for PDSCH data for the case the indication is present and the E-PDCCH and PDSCH have a hybrid time/frequency domain multiplexing (which can be abbreviated as TDM since the other embodiment does not use TDM at all). In case frequency domain multiplexing is applied (without TDM hybrid), the PRBs are neglected for PDSCH data decoding and are decoded by the UE only for the E-PDCCH. In this latter case the E-PDCCH is decoded using the phase shifted RS.

Embodiments of the present invention as detailed at FIGS. 8A-B and further detailed above may be implemented in tangibly embodied software, hardware, application logic or a combination of software, hardware and application logic. In an exemplary embodiment, the application logic, software or an instruction set is maintained on any one of various conventional computer-readable media. The methods represented by FIG. 7 or 8A or 8B may be performed via hardware elements, via tangibly embodied software executing on a processor, or via combination of both. A computer program product comprising a computer-readable medium bearing computer program code embodied therein for use with a computer, the computer program code comprising may be for example any of the MEMs detailed below with respect to FIG. 9.

If desired, the different functions discussed herein may be performed in a different order and/or concurrently with each other. Furthermore, if desired, one or more of the above-described functions may be optional or may be combined.

Figure 9:
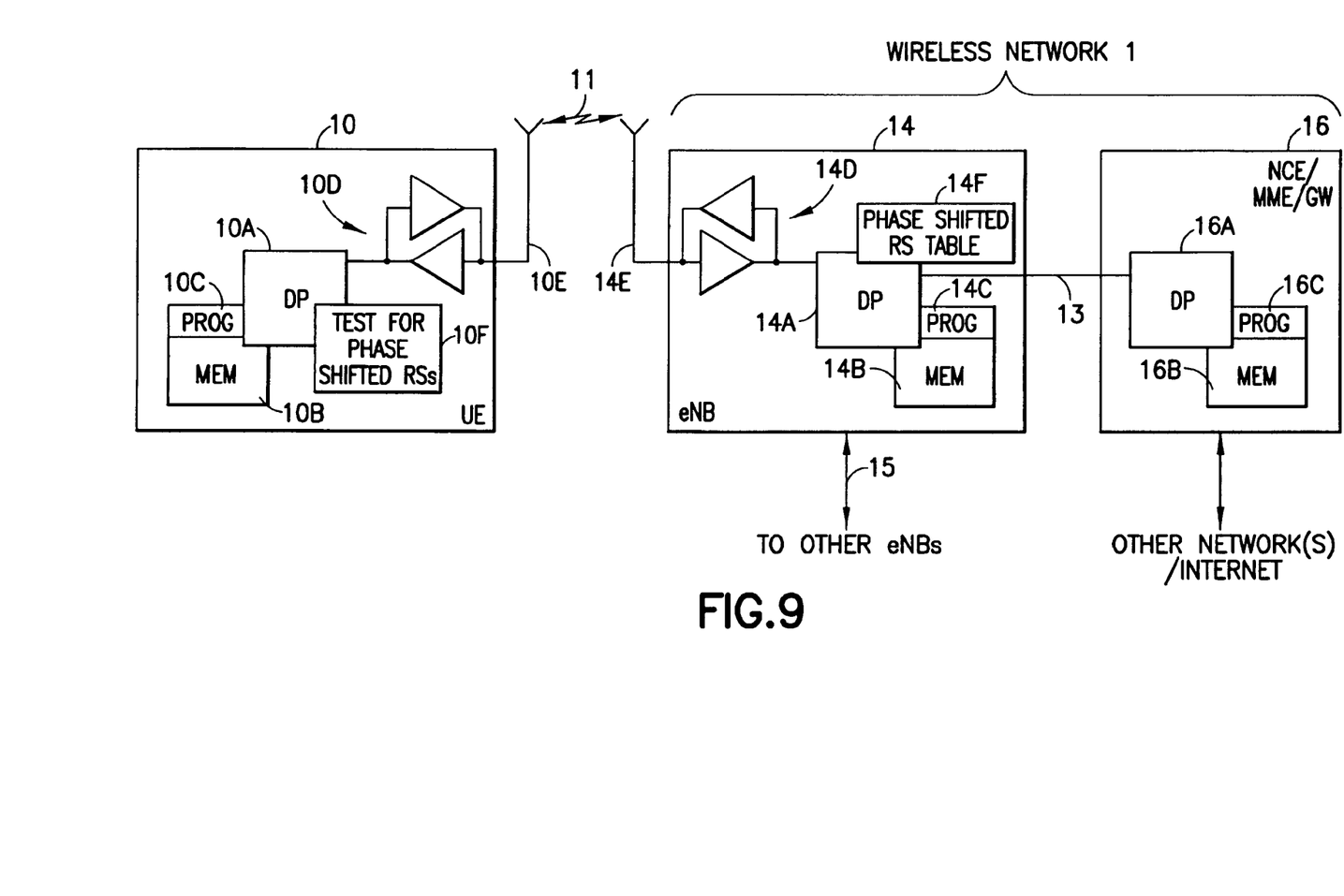
FIG. 9 is a schematic block diagram showing various electronic devices/apparatus suitable for implementing exemplary embodiments of the invention detailed herein.

Reference is now made to FIG. 9 for illustrating a simplified block diagram of various electronic devices and apparatus that are suitable for use in practicing the exemplary embodiments of this invention. In FIG. 9, a wireless network 1 is adapted for communication over a wireless link 11 with apparatus, such as a mobile communication device which may be referred to as a UE 10, via a network access node, such as an eNodeB (eNB) 14 for the case of an LTE or LTE-A network. Each of the UEs 10 (one illustrated at FIG. 9) communicates using a wireless link 11 with the eNodeB 14. The wireless network 1 may include a network control element (NCE) 16 that may implement MME and/or serving gateway (S-GW) functionality such as that known in the LTE system, and which provides connectivity with a further network, such as a telephone network and/or a data communications network (e.g., the Internet).

The UE 10 includes a controller, such as a computer or a data processor (DP) 10A, a computer-readable memory (MEM) 10B that tangibly stores a program of computer instructions (PROG) 10C, and at least one suitable radio frequency (RF) transmitter and receiver (shown together as 10D) for bidirectional wireless communications with the eNodeB 14 via one or more antennas 10E (one shown). The UE 10 has functionality shown at 10F to test for whether the RSs are phase shifted relative to one another as detailed by example above.

The eNodeB 14 also includes a controller, such as a computer or a data processor (DP) 14A, a computer-readable memory (MEM) 14B that tangibly stores a program of computer instructions (PROG) 14C, and at least one suitable RF transmitter and receiver shown together as 14D) for communication with the UE 10 via one or more antennas 14E (one shown, but typically implemented as an array). The eNodeB 14 has functionality to implement the 180 degree phase shift at 14F, such as by storing the table shown at FIG. 6 and utilizing it to generate RSs for transmission as detailed at FIGS. 7 and 8A. The eNodeB 14 is additionally coupled via a data/control path 13 to the NCE 16. The NCE 16 also includes a controller, such as a computer or a data processor (DP) 16A and a computer-readable memory (MEM) 16B that stores a program of computer instructions (PROG) 16C. The NCE 16 may be connected to additional networks such as the Internet. The path 13 may be implemented as the S1 interface known for the LTE system. The eNodeB 14 may also be coupled to another eNodeB (or Node B) via data/control path 15, which may be implemented as the X2 interface known in the LTE system.

The techniques herein may be considered as being implemented solely as computer program code embodied in a memory resident within the UE 10 or eNodeB 14 (e.g., as PROG 10C or 14C, respectively), or as a combination of embodied computer program code (executed by one or more processors) and various hardware, including memory locations, data processors, buffers, interfaces and the like, or entirely in hardware (such as in a very large scale integrated circuit). Additionally, the transmitters and receivers 10D and 14D may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 14A may be of any type suitable to the local technical environment, and may include one or more of general purpose computers, special purpose computers, microprocessors, digital signal processors (DSPs) and processors based on a multi-core processor architecture, as non-limiting examples.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory storing computer program code,
   in which the at least one memory storing the computer program code is configured, with the at least one processor, to cause the apparatus to at least:
   signal an allocation for a downlink shared channel; and
   signal an indication whether a resource block comprising the allocated downlink shared channel is used for a control channel transmission, wherein the indication comprises a different reference signal sequence than an original reference signal sequence, wherein the different reference signal sequence is used when the resource block is used for the control channel transmission, and wherein the different reference signal sequence comprises a phase shifted version of the original reference signal sequence.

2. The apparatus according to claim 1, wherein:
   for the case the control channel transmission is time division multiplexed with the allocated downlink shared channel, the indication indicates whether a portion of the resource block is used for the control channel transmission; or
   for the case the control channel transmission is frequency division multiplexed with the allocated downlink shared channel, the indication indicates whether the full resource block is used for the control channel transmission.

3. The apparatus according to claim 1, in which the different reference signal sequence comprises an orthogonal version with respect to the original reference signal sequence used if the resource block were not used for the control channel transmission.

4. The apparatus according to claim 1, in which the different reference signal sequence is a dedicated, "UE-specific" reference signal having at least one element shifted 180 degrees as compared to the original reference signal sequence; and the indication is disposed in a first slot of the resource block.

5. The apparatus according to claim 1, in which the apparatus comprises an eNodeB operating in a third generation partnership project long term evolution system, the allocation is signaled in a physical downlink control channel or enhanced physical downlink control channel which allocates a physical downlink shared channel, and the indication indicates whether there is an enhanced physical downlink control channel present in the resource block.

6. A method comprising:
signaling by an apparatus an allocation for a downlink shared channel; and
signaling by the apparatus an indication whether a resource block comprising the allocated downlink shared channel is used for a control channel transmission, wherein the indication comprises a different reference signal than an original reference signal sequence, wherein the different reference signal sequence is used when the resource block is used for the control channel transmission, and wherein the different reference signal sequence comprises a phase shifted version of the original reference signal sequence.

7. A computer program product comprising a non-transitory computer-readable medium storing a program of instructions, execution of which by a processor configures an apparatus to at least:
signal an allocation for a downlink shared channel; and
signal an indication whether a resource block comprising the allocated downlink shared channel is used for a control channel transmission, wherein the indication comprises a different reference signal sequence than an original reference signal sequence, wherein the different reference signal sequence is used when the resource block is used for the control channel transmission, and wherein the different reference signal sequence comprises a phase shifted version of the original reference signal sequence.

8. An apparatus comprising:
at least one processor; and
at least one memory storing computer program code, in which the at least one memory storing the computer program code is configured to, with the at least one processor, cause the apparatus to perform at least the following:
determine whether a resource block received on an allocated downlink shared channel comprises an indication that the resource block is used for a control channel transmission; and
decode the resource block for data according to whether or not the indication is present wherein, in response to the resource block being used for the control transmission, the indication comprises a different reference signal sequence than an original reference signal sequence, wherein the different reference signal sequence is used when the resource block is used for the control channel transmission, and wherein the different reference signal sequence comprises a phase shifted version of the original reference signal sequence.

9. The apparatus according to claim 8, in which the different reference signal sequence comprises a partially phase shifted version of the original reference signal sequence.

10. The apparatus according to claim 8, wherein the determination is performed by comparing channel estimates of two candidate references signal sequences of the resource block and if there is a phase shift detected then to conclude that a portion of or the full resource block is used for a control channel transmission.

11. The apparatus according to claim 8, in which the at least one memory and the computer program code are configured with the at least one processor to cause the apparatus to decode the resource block according to whether the indication is present by:
decoding the resource block for data for the case the indication is not present; and one of
decoding a portion of the resource block for data for the case the indication is present and the control channel transmission is time division multiplexed with the allocated downlink shared channel; or
decoding the full resource block only for the control channel transmission for the case the indication is present and the control channel transmission is frequency division multiplexed with the allocated downlink shared channel.

12. A method comprising:
determining whether a resource block received on an allocated downlink shared channel comprises an indication that the resource block is used for a control channel transmission; and
decoding the resource block for data according to whether the indication is present wherein, in response to the resource block being used for the control transmission, the indication comprises a different reference signal sequence than an original reference signal sequence, wherein the different reference signal sequence is used when the resource block is used for the control channel transmission, and wherein the different reference signal sequence comprises a phase shifted version of the original reference signal sequence.

13. The method according to claim 12, in which decoding the resource block according to whether the indication is present comprises:
decoding the resource block for data for the case the indication is not present; and one of
decoding a portion of the resource block for data for the case the indication is present and the control channel transmission is time division multiplexed with the allocated downlink shared channel; or
decoding the full resource block only for the control channel transmission for the case the indication is present and the control channel transmission is frequency division multiplexed with the allocated downlink shared channel.

14. A computer program product comprising a non-transitory computer-readable medium bearing computer program code execution of which by a processor configures an apparatus to at least:
determine whether a resource block received on an allocated downlink shared channel comprises an indication that the resource block is used for a control channel transmission; and
decode the resource block for data according to whether or not the indication is present wherein, in response to the resource block being used for the control transmission, the indication comprises a different reference signal sequence than an original reference signal sequence, wherein the different reference signal sequence is used when the resource block is used for the control channel transmission, and wherein the different reference signal sequence comprises a phase shifted version of at least a portion of the original reference signal sequence.

* * * * *